United States Patent [19]

Ishino et al.

[11] Patent Number: 4,945,368
[45] Date of Patent: Jul. 31, 1990

[54] CAMERA WITH BUILT-IN ELECTRONIC FLASH

[75] Inventors: Tokio Ishino, Kawasaki; Atsushi Sato, Tokorozawa; Motokuni Demura, Yokohama, all of Japan

[73] Assignee: Ricoh Company, Ltd., Tokyo, Japan

[21] Appl. No.: 404,454

[22] Filed: Sep. 8, 1989

[30] Foreign Application Priority Data

Sep. 10, 1988 [JP] Japan .................. 63-118343[U]

[51] Int. Cl.$^5$ ............................................. G03B 15/03
[52] U.S. Cl. ............................................. 354/149.11
[58] Field of Search ............... 354/145.1, 149.1, 149.11

[56] References Cited

U.S. PATENT DOCUMENTS 3,260,181 7/1966 Hennig et al. ............... 354/149.11

FOREIGN PATENT DOCUMENTS 55-22710 1/1980 Japan .
56-51730 5/1981 Japan .
56-162731 12/1981 Japan .
60-18050 5/1985 Japan .
62-121428 6/1987 Japan .

*Primary Examiner*—Brian W. Brown
*Attorney, Agent, or Firm*—Oblon, Spivak, McClelland, Maier & Neustadt

[57] ABSTRACT

A camera comprises a camera body which is integrally formed with a lens barrel containing a lens having an optical axis. A receiving chamber for receiving an elongated electronic flash body is formed along the lateral side of the lens barrel in parallel to the optical axis of the lens. The electronic flash body having top and bottom ends is provided at its one side with a light emitting window located near the top end thereof. The flash body is built into the camera body through a pop-up means so as to be moved between a first position at which substantially the overall length of the flash body is received into the receiving chamber in the state that the light emitting window is oriented downward and that the bottom end of the flash body is located in the rear end portion of the receiving chamber, and a second position at which the flash body is raised upward from the camera body in the state that the light emitting window is oriented forward and that the bottom end of the flash body is located in the front end portion of the receiving chamber.

6 Claims, 5 Drawing Sheets

CAMERA WITH BUILT-IN ELECTRONIC FLASH

BACKGROUND OF THE INVENTION

The present invention relates generally to a photographic camera with a built-in electronic flash. More particularly, the invention relates to a photographic camera having a camera body which is integrated with a lens barrel containing a vari-focal lens and which contains a built-in electronic flash which can be projected upward from the camera body.

Photographic cameras in which a camera body is integrated at its front side with a lens barrel containing a photographing lens having an optical axis and contains a built-in electronic flash having a light emitting window, have been widely used. In such cameras, when a flash of light emitted from the light emitting window of the electronic flash is too close to an optical axis of the photographing lens, the so-called red-eye phenomenon may occur. Therefore, various proposals for preventing the occurrence of red-eye phenomenon while keeping the camera to be compact have been made.

In an exemplary camera of this type, a built-in electronic flash having a light emitting window is so constructed as to be projected upward from the upper side of a camera body so that the light emitting window can be spaced far away from an optical axis of a photographing lens. On the other hand, the electronic flash can be accommodated or retracted into the camera body when the electronic flash is not used.

Japanese Utility Model Application laying-Open (KOKAI) No. 61-116334 (referred to as a first reference, hereinafter) discloses a camera in which a built-in electronic flash having a light emitting window is pivotably supported by a movable support member which is accommodated into a camera body at a position close to the left or right edge of an upper surface of the camera body. When the electronic flash is to be used, the supporting member is moved upward from the upper surface of the camera body. As the support member is moved upward, the light emitting window of the electronic flash is rotated in relation to the support member so as to face to the front of the camera body.

Japanese Patent Application laying-Open (KOKAI) No. 62-121428 (referred to as a second reference, hereinafter) discloses a camera in which a raising mechanism is provided for raising a built-in electronic flash having a light emitting window from a dead space formed along a top portion of a pentaprism mounted on an upper middle portion of a camera body. In this construction, when the electronic flash is not used, the flash light emitting window can be retracted into the dead space of the camera body, and when the electronic flash is to be used, the flash light emitting window can be raised above the pentaprism.

Japanese Patent Application laying-Open (KOKAI) No. 62-131239 (referred to as a third reference, hereinafter) discloses a camera in which a built-in electronic flash having a light emitting window is supported by a rotating mechanism provided on the slope of a prism cover which, in turn, is fitted over a top portion of a pentaprism mounted on an upper middle portion of a camera body. In this construction, when the electronic flash is not used, the flash light emitting window can be oriented toward the back of the camera body along the slope of the prism cover, in order to reduce the overall height of the camera, and when the electronic flash is to be used, the flash light emitting window can be turned to orient toward the front of the camera body. As the flash light emitting window is turned toward the front of the camera body, the distance from an optical axis of the photographing lens to the light emitting window is slightly increased.

Japanese Utility Model Application laying-Open (KOKAI) No. 61-140337 (referred to as a fourth reference, hereinafter) discloses a camera in which a lens cover for covering a photographing lens of the camera is pivotably attached at its root end to an upper side of the camera, and in which a light emitting window of an electronic flash is secured to a tip or free end portion of the lens cover. In this construction, when a photograph is to be taken by the camera, the lens cover is pivoted upward in order to open the front face of the lens of the camera, causing the flash light emitting window to be located above an optical axis of a photographing lens.

Further, Japanese Utility Model Application laying-Open (KOKAI) No. 61-76425 (referred to as a fifth reference, hereinafter) discloses a camera in which a camera body having a lens barrel containing a zoom lens is formed at its lateral side with a handgrip, and in which a light emitting window of an electronic flash is secured to a top end of the handgrip so as to be spaced far away from an optical axis of the zoom lens.

However, in the case of the cameras as disclosed in the above-mentioned first through third references, when the camera body is integrated at its front side with a barrel containing a vari-focal lens, a flash of light emitted from the light emitting window is apt to be mechanically vignetted by the forward portion of the lens barrel due to a relatively long overall length of the lens barrel.

On the other hand, in the case of the camera as disclosed in the fourth reference, when the camera is provided with a vari-focal lens such as a zoom lens having a long overall length, the lens cover for covering the lens has to be made with a bulky and complicated configuration, and accordingly, it is virtually impossible to mount the light emitting window of the electronic flash on the lens cover without a remarkable increase in size of the lens cover.

Further, in the case of the camera as disclosed in the fifth reference, since the light emitting window is spaced away from the optical axis of the photographing lens in the lateral direction, a flash photography is performed with the so-called side lighting. As the result, undesirable shadow tends to occur in the lateral side of an object, particularly, on the background wall or the like.

Furthermore, in the above-described arrangements of the electronic flash in the camera body, as disclosed in the first through fifth references, it is difficult to apply a built-in electronic flash having a relatively large guide number to the camera body without increasing the overall height, length, or width of the camera.

SUMMARY OF THE INVENTION

It is therefore an object of the present invention to provide a camera which makes it possible to reduce a possibility of occurrence of mechanical vignetting of a flash of light due to an existence of a lens barrel, as well as a possibility of occurrence of the so-called red-eye phenomenon and a possibility of occurrence of an undesirable shadow due to a side lighting, even if the the overall length of the lens barrel is relatively long, and which can be made compact when a built-in electronic flash is not used.

The object of the invention can be achieved by a camera comprising: a camera body which is integrally formed with a lens barrel containing a lens having an optical axis, and which defines a receiving chamber extending along the lateral side of the lens barrel in parallel to the optical axis of the lens, the receiving chamber having front and rear end portions and being open forward and upward at the fore end portion thereof; and an elongated electronic flash body having top and bottom ends and provided at its one side with a light emitting window located near the top end thereof, the flash body being built into the camera body through a pop-up means so as to be moved between a first position at which substantially the overall length of the flash body is received into the receiving chamber in the state that the light emitting window is oriented downward and that the bottom end of the flash body is located in the rear end portion of the receiving chamber, and a second position at which the flash body is raised upward from the camera body in the state that the light emitting window is oriented forward and that the bottom end of the flash body is located in the front end portion of the receiving chamber.

In the camera having the above-mentioned construction, when the flash body is located at its second position, the light emitting window is located above the optical axis of the vari-focal lens in the state that a sufficient distance is ensured therebetween. Accordingly, it is possible to reduce a possibility of occurrence of the so-called red-eye phenomenon as well as a possibility of occurrence of an undesirable shadow due to a side lighting.

Further, when the flash body is located at its second position, since the light emitting window of the flash body and a front end of the lens barrel are close to each other in the forward and backward directions, a possibility of occurrence of mechanical vignetting of a flash of light due to an existence of a lens barrel can be reduced, even if the overall length of the lens barrel is relatively long.

Furthermore, when the electronic flash body is not used, the overall length of the flash body can be received into the receiving chamber which is formed in the camera body by utilizing a relatively long dead space along the lateral side of the lens barrel containing the vari-focal lens. Accordingly, the camera can be made compact when the flash body is not used, and it is possible to employ a flash body having a relatively large guide number.

Preferably, the pop-up means comprises: a pushing means for moving the bottom end of the flash body from the rear end portion to the front end portion of the receiving chamber, the pushing means being adapted to apply a pushing force to the flash body near the bottom end thereof; and a guide means for raising upward the flash body from the camera body by utilizing the pushing force of the pushing means when the bottom end of the flash body approaches the front end portion of the receiving chamber. According to this construction of the pop-up means, a nimble pop-up movement of the flash body can be performed with a simple construction.

Further objects, features and advantages of the present invention will become apparent from the following description of the preferred embodiments of the present invention as illustrated in the accompanying drawings.

DESCRIPTION OF THE PREFERRED EMBODIMENTS

FIGS. 1 to 5 show a first embodiment of a photographic camera according to the present invention.

Figure 1:
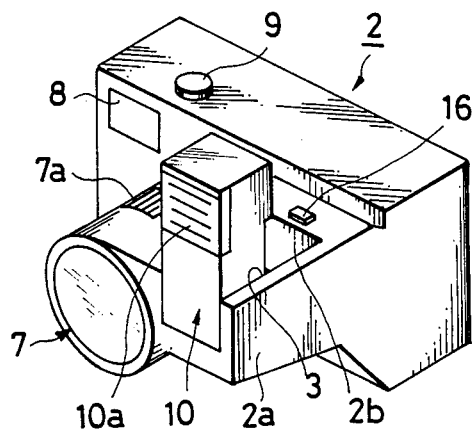
FIG. 1 is a perspective view showing an external appearance of one embodiment of a photographic camera constructed in accordance with the present invention, in which an electronic flash body is in the raised position for emitting a flash of light.
Figure 2:
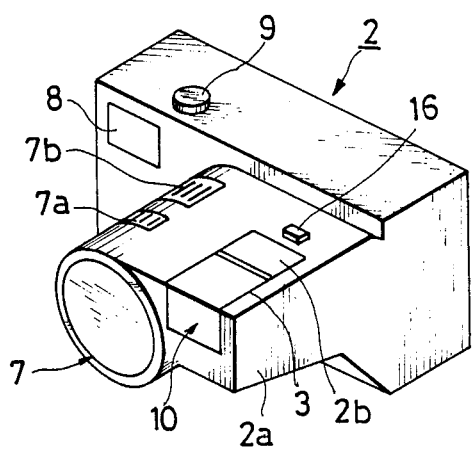
FIG. 2 is a perspective view showing an external appearance of the camera shown in FIG. 1, in which the electronic flash body is in the retracted position.

Referring first to FIGS. 1 and 2, the camera comprises a camera body 2 which can accommodate in place a photographic film cartridge (not shown) and a battery. The camera body 2 is provided at its front side with a lens barrel 7 which contains a vari-focal lens such as zoom lens or macro-zoom lens having an optical axis. A focusing ring 7a and a zoom ring 7b are provided on the left side of the lens barrel 7. A viewfinder window 8 is located on the upper left corner of the front side of the camera body 2, and a shutter release button 9 is disposed on a upper side of the camera body 2. Other functional accessories such as various operation buttons, indicators or the like are also disposed on the upper side of the camera body 2, but are omitted from FIGS. 1 and 2 for the sake of simplicity.

The camera body 2 has a bulge portion 2a which extends from the front side of the camera body 2 along the right side of the lens barrel 7. The bulge portion 2a of the camera body 2 is integrally formed with the lens barrel 7. The length of the bulge portion 2a from the front side of the camera body 2 is approximately equal to that of the lens barrel 7. A receiving chamber 3 is formed in the bulge portion 2a, the receiving chamber 3 accommodates an elongated electronic flash body 10 having a generally rectangular parallelepiped shape. The receiving chamber 3 extends along the right side of the lens barrel 7 in parallel to the optical axis of the vari-focal lens and is open to upper and front surfaces of the bulge portion 2a.

The receiving chamber 3 has front and rear end portions, and the rear end portion of the chamber 3 is covered with a cover plate 2b which is secured to the bulge portion 2a, so that only the front end portion of the receiving chamber 3 can be open to the upper and front surfaces of the bulge portion 2a.

The flash body 10 has a top and bottom ends and is provided at its front side with a light emitting window 10a which is located near the top end of the flash body 10.

Figure 3:
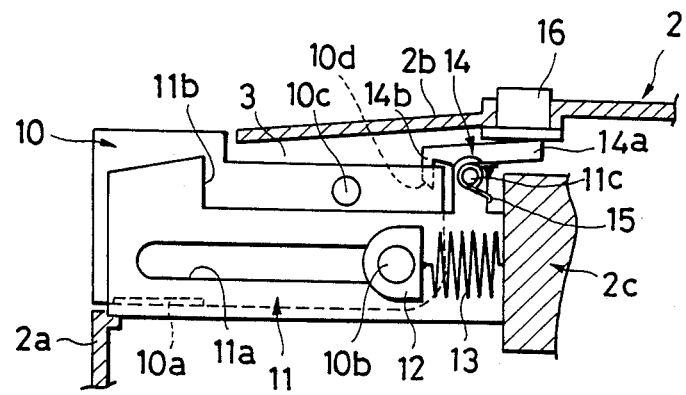
FIGS. 3 to 5 are cross-sectional views of a main part of the camera shown in FIG. 1, respectively, for explaining a pop-up movement of the electronic flash body.
Figure 4:
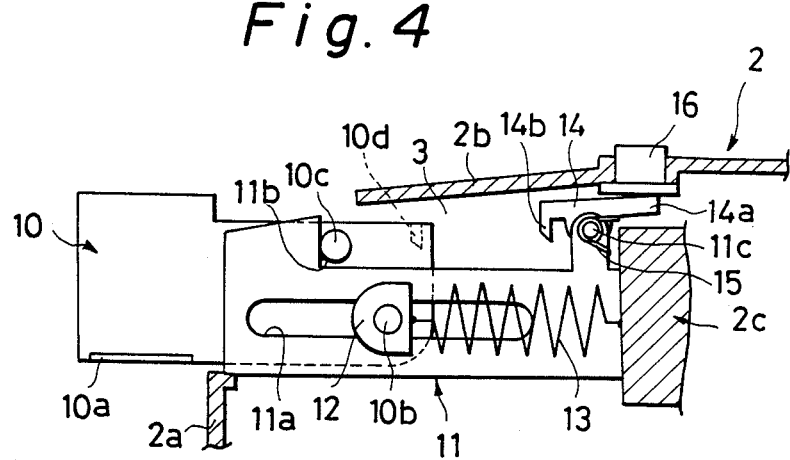
Figure 5:
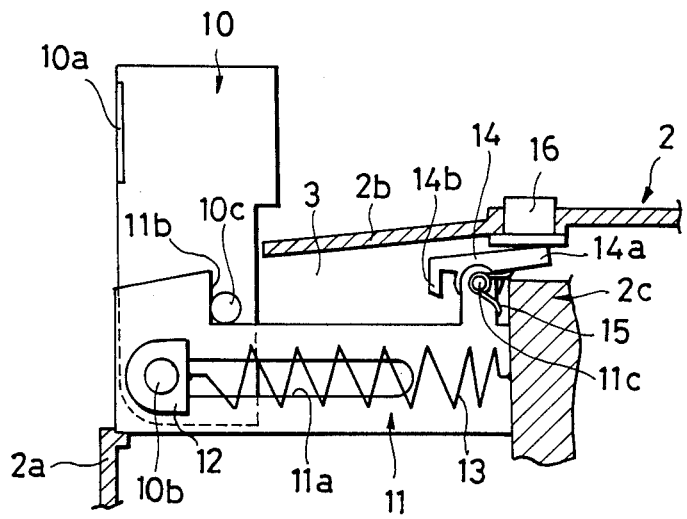

FIGS. 3 to 5 are cross-sectional views of a main part of the camera shown in FIG. 1, respectively, for explaining a pop-up movement of the electronic flash body. Referring now to FIG. 3, the rear end of the receiving chamber 3 is defined by an inner wall 2c of the camera body 2. FIG. 3 shows that the flash body 10 is in a first position at which substantially the overall length of the flash body 10 is received into the receiving chamber 3 in the state that the light emitting window 10a is oriented downward and that the bottom end of the flash body 10 is located in the rear end portion of the receiving chamber 3. Therefore, the light emitting window 10a is protected from an injury and dirt. When the flash body 10 ia located at its first position, as shown in FIG. 3, a top end of the flash body 10 is approximately in alignment with the front surface of the bulge portion 2a of the camera body 2, while a back side of the flash body 10 is in alignment with the upper surface of the cover plate 2b.

On the other hand, FIG. 5 show that the flash body 10 is in a second position at which the flash body 10 is raised upward from the bulge portion 2a of the camera body 2 in the state that the light emitting window 10a is oriented forward and that the bottom end of the flash body 10 is located in the front end portion of the receiving chamber 3.

The flash body 10 can be moved by a pushing means from the first position shown in FIG. 3 to the second position shown in FIG. 5 through an intermediate position shown in FIG. 4, as described later in more detail.

In this embodiment, the pop-up means comprises a compression spring 13 as a pushing means for moving the bottom end of the flash body 10 from the rear end portion to the front end portion of the receiving chamber 3. The compression spring 13 is adapted to apply a pushing force to the flash body 10 near the bottom end thereof. A pushing force to the flash body 10 can be applied by a motor drive instead of spring 13. A guide means is provided for raising the flash body 10 from the camera body 2 by utilizing the pushing force of the compression spring 13 when the bottom end of the flash body 10 approaches the front end portion of the receiving chamber 3.

The guide means comprises a stopper member 11b which is disposed in the front end portion of the receiving chamber 3. A stopper pin 10c is fixed to the flash body 10 at a position near the bottom end of the flash body so as to be abutted on the stopper member 11b at a position which is spaced forward and upward from a point of action of the pushing force of the compression spring 13 in relation to the flash body 10 when the bottom end of the flash body 10 approaches the front end portion of the receiving chamber 3.

In this embodiment, the guide means further comprises a guide plate 11 which is secured at its rear end to the inner wall 2c of the camera body 2 and which is integrally formed at its front end with the stopper member 11b. The guide plate 11 defines therein an elongated guide slot 11a which extends between the front and rear end portions of the receiving chamber 3. A guide pin 10b fixed to the flash body 10 at a position near the bottom end of the flash body 10 is in slidable engagement with the guide slot 11a of the guide plate 11. A support member 12 is rotatably fitted over the guide pin 10b. The compression spring 13 is connected at its front end to the support member 12 and at its rear end to the inner wall 2c of the camera body 2 so that the pushing force of the compression spring 13 can be applied to the flash body 10 through the guide pin 10b.

A support pin 11c is fixed to the guide plate 11, and a lock lever 14 for locking the flash body 10 in the first position thereof against the pushing force of the compression spring 13 is rotatably supported at its middle portion to the support pin 11c. The lock lever 14 is provided at its one end with a claw 14b and is forced by a bias spring 15 in the counterclockwise direction in FIG. 3, so that when the flash body is located at its first position, the claw 14b of the lock lever 14 can be engaged with a recess 10d formed in the flash body 10.

Movably supported by the upper wall of the camera body 2 and abutted on the other end 14a of the lock lever 14A is a pop-up button 16 as a releasing member for releasing the locking member 14 from the flash body.

Explanation will now be made as to the pop-up movement of the flash body 10.

When the lock lever 14 is released from the flash body 10, the flash body 10 is linearly moved forward from the first position by virtue of the pushing force of the compression spring 13, until the stopper pin 10c abuts on the stopper member 11b. When the stopper pin 10c is abutted on the stopper member 11b, as shown in FIG. 4, the pushing force of the compression spring 13 is converted to a rotating force which causes the flash body 10 to rotate about the contact portion of the stopper pin 10c with the stopper member 11b in the clockwise direction in FIG. 4. The flash body 10 is rotated until the guide pin 10b is abutted on a front end of the guide slot 11a, as shown in FIG. 5. In this way, the flash body 10 is raised upward in relation to the camera body 2 in the state that the light emitting window 10a is oriented forward and that the bottom end of the flash body 10 is located in the front end portion of the receiving chamber 3.

When the flash body 10 is located at its second position, as shown in FIG. 5, the light emitting window 10a is located above the optical axis of the vari-focal lens in the state that a sufficient distance is ensured therebetween. Accordingly, it is possible to reduce a possibility of occurrence of the so-called red-eye phenomenon as well as a possibility of occurrence of an undesirable shadow due to a side lighting.

Further, when the flash body 10 is located at its second position, since the light emitting window 10a of the flash body 10 and a front end of the lens barrel 7 are close to each other in the forward and backward directions, a possibility of occurrence of mechanical vignetting of a flash of light due to an existence of a lens barrel 7 can be reduced, even if the overall length of the lens barrel 7 is relatively long.

Of course, the flash body 10 can be moved manually from its second position shown in FIG. 5 to its first position shown in FIG. 3 through its intermediate position shown in FIG. 4 against the pushing force of the compression spring 13.

Figure 6:
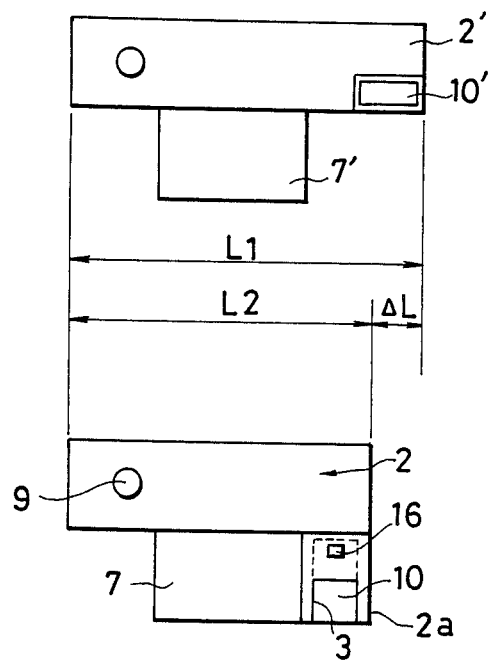
FIG. 6 is a view for explaining the technical effect of the present invention.

FIG. 6 is a view for explaining a dimensional merit of the present invention. At its upper portion, FIG. 6 shows a plan view of a conventional camera in which reference numerals 2', 7', and 10' designate a camera body, lens barrel, and electronic flash body, respectively. In the illustrated conventional camera, the flash body 10' is so constructed as to be projected upward from an upper surface of the camera body 2' by means of a pop-up means (not shown). In such a construction of the conventional camera, it is necessary to ensure a space for receiving the flash body 10' as well as a space for receiving a photographic film cartridge, resulting in an increase in the overall width L1 of the camera body 2'. At its lower portion, FIG. 6 shows a plan view of the first embodiment of the camera according to the present invention. As shown in FIG. 6, the overall width L2 of the camera body 2 constructed in accordance with the present invention can be decreased by a certain amount ΔL in comparison to the overall width L1 of the conventional camera body 2'. This is because the receiving chamber 3 in the present invention is formed in the bulge portion 2a of the camera body 2 by utilizing a dead space along the lateral side of the lens barrel 7.

Figure 7:
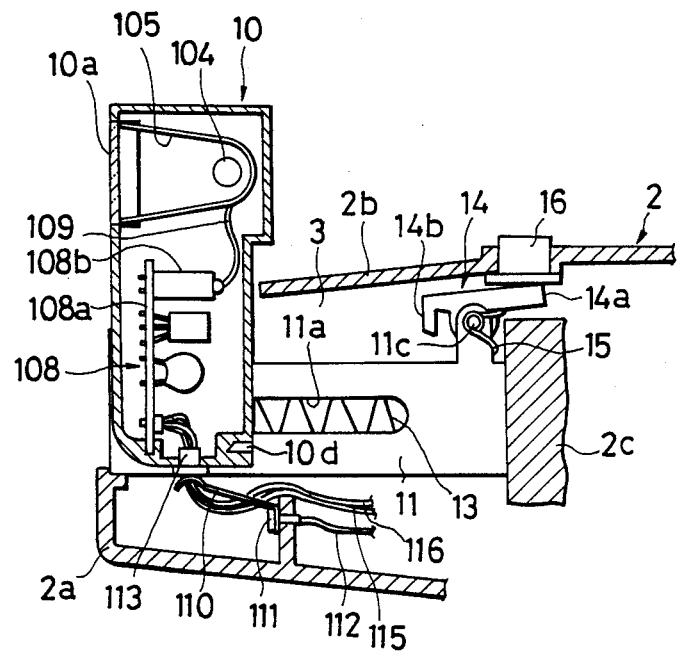
FIG. 7 is a cross-sectional view of a main part of a second embodiment of a camera constructed in accordance with the present invention, in which an improved flash drive system is applied to the electronic flash body.
Figure 8:
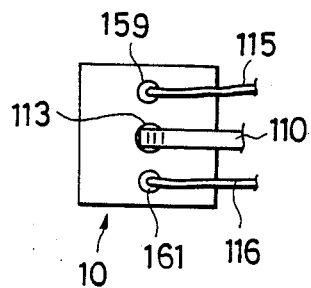
FIG. 8 is a bottom view of the flash body shown in FIG. 7, illustrating an electrical connection.
Figure 9:
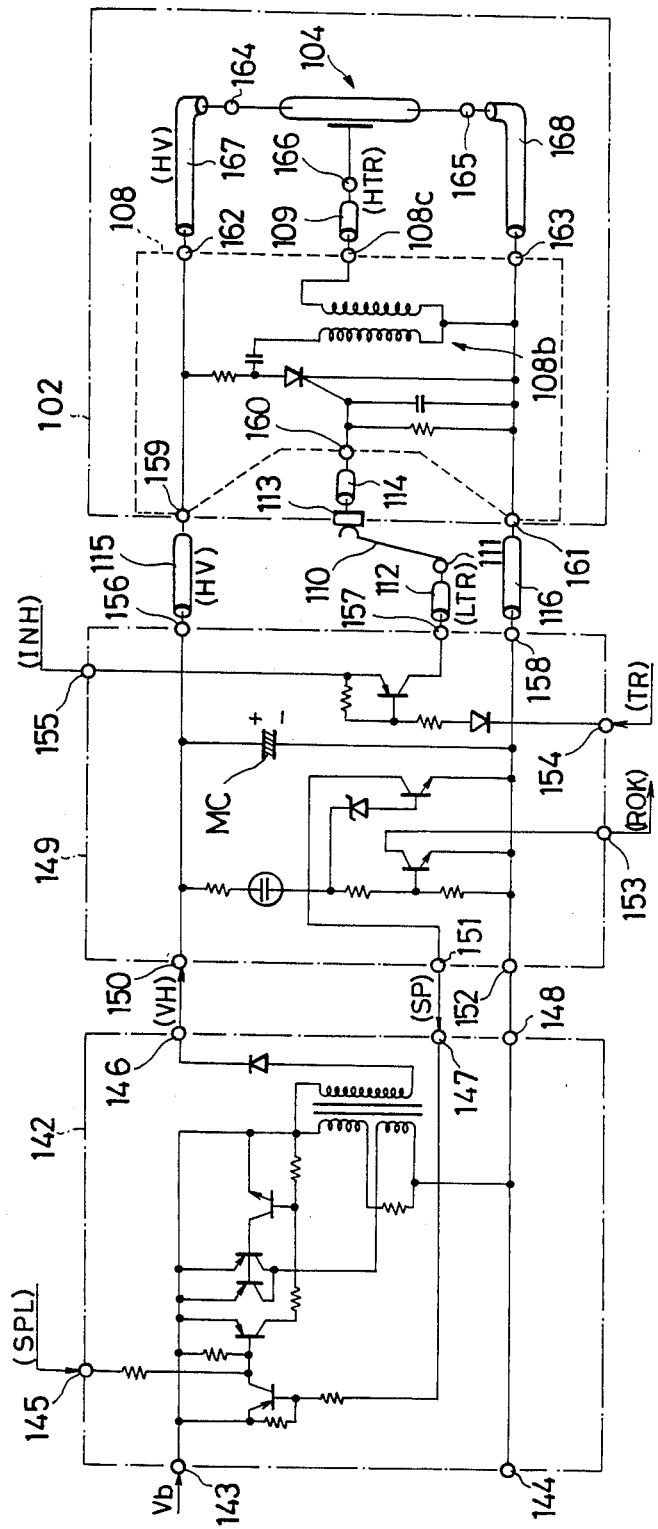
FIG. 9 shows an electric circuit used in the second embodiment shown in FIG. 7.

A second embodiment of the camera according to the present invention is illustrated in FIGS. 7 to 9 which use the same reference numerals to denote the same components as those in FIGS. 1 to 5, so that there is no need for all those components to be described in detail yet again.

Referring first to FIG. 7, the flash body 10 is provided therein with a flash lamp 104 and a reflection lampshade 105. Also provided in the flash body 10 is a trigger booster circuit 108 which comprises a circuit board 108a. A trigger booster element 108b and other elements are mounted on the circuit board 108a. An output terminal 108c of the booster element 108b is connected to a trigger electrode 166 (see FIG. 9) of the flash lamp 104 through a high voltage supply wire 109.

Referring to FIG. 9, the trigger booster circuit 108 is connected through a charging circuit 149 to a high voltage generating circuit 142. The latter circuits 149 and 142 are fixedly disposed in the camera body 2.

The high voltage generating circuit 142 contains the so-called DC—DC converter and is adapted to generate a high voltage of several hundreds volts. Reference numerals 143 to 148 each designates a terminal, in which reference numeral 143 designates a power input terminal for receiving a low direct current (DC) voltage of several volts; 144 a ground (GND) terminal; 145 a signal input terminal for receiving a charge enabling signal (SPL); 146 a high voltage output terminal for sending the above-mentioned high voltage of several hundreds volts (VH) to the charging circuit 149; 147 a signal input terminal for receiving a stop signal (SP) for stopping the generation of the high voltage (VH); and reference numeral 148 designates a GND terminal which is connected to the terminal 144.

The charging circuit 149 serves to charge the above-mentioned high voltage (VH) into a main condenser MC and also serves to determine the emitting timing of flash light. Reference numerals 150 to 158 each designates a terminal, in which reference numeral 150 designates a high voltage input terminal for receiving the above-mentioned high voltage (VH); 151 a signal output terminal for sending the above-mentioned stop signal (SP); 152 a GND terminal connected to the GND terminal 148; 153 a signal output terminal for sending a charge-completed signal (ROK) to a main controller (not shown) of the camera; 154 a trigger input terminal for receiving a trigger signal (TR) for indicating the emitting of flash light; 155 a signal input terminal for receiving an inhibition signal (INH) for indicating the inhibition of emitting of flash light; 156 a high voltage output terminal connected to the high voltage input terminal 150; 157 a low voltage trigger output terminal for sending a low voltage trigger signal (LTR) to the trigger booster circuit 108; and reference numeral 158 designates a GND terminal connected to the terminal 152.

Reference numerals 159 to 163 each designates a terminal of the trigger booster circuit 108, in which 159 is a high voltage input terminal; 160 a low voltage trigger input terminal; 161 a GND terminal; 162 a high voltage output terminal connected to the terminal 159; and reference numeral 163 designates a GND terminal connected to the terminal 161.

The flash lamp 104 has a pair of main electrodes 164 and 165. The main electrode 162 is connected to the terminal 162 through a high voltage supply wire 167, while the other main electrode 165 is connected to the GND terminal 163 through a GND lead wire 168.

The terminal 159 of the trigger booster circuit 108 is connected to the terminal 156 of the charging circuit 149 through a high voltage supply wire 115, while the GND terminals 161 and 158 are connected to each other through a GND lead wire 116.

Further, the terminal 160 is connected to a stationary contact 113 through a signal lead wire 114. As shown in FIGS. 7 and 8, the stationary contact 113 as well as the terminals 159 and 161 is secured to the bottom surface of the flash body 10. On the other hand, the terminal 157 of the charging circuit 149 is connected through a signal lead wire 112 to the brush member 110 which is made of a resilient conductive material. As shown in FIG. 7, the brush member 110 is secured at its root end to the bulge portion 2a of the camera body 2 by means of a stationary contact 111. As apparent from FIG. 7, the stationary contact 113 of the trigger booster circuit 108 is so arranged as to be in contact with the tip of the brush member 110 only when the flash body 10 is located at its second position (i.e., a raised position).

Generally, a high voltage supply wire for supplying a high voltage power to the flash light emitting portion of the flash body 10 has a relatively high rigidity. Therefore, if the movable flash body 10 is electrically connected to a controller or power source secured in the camera body 2 through several high voltage supply wires, the movement of the flash body 10 will be resisted by such wires. With this respect, in the second embodiment of the present invention, the above-mentioned combination of the contact elements 110 and 113 for electrical connection is used in place of a relatively rigid wire, the movement of the flash body 10 can be improved.

Figure 10:
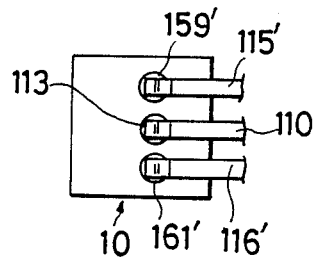
FIG. 10 is a bottom view of the flash body showing another modification of the electrical connection.

Similarly, brush members 115' and 116' and stationary contacts 159' and 161' may be used in place of the high voltage wires 115 and 116, as shown in FIG. 10.

While the invention has been described in conjunction with specific embodiments thereof, it is evident that many alternatives and modifications will be apparent to those skilled in the art in light of the foregoing description.

For example, instead of the compression spring 13 as a pushing means, an actuator such as stepping motor may be used for moving the flash body 10 between the first and second position thereof, in such a manner that a drive force is directly transmitted from the actuator to the support member 12. In this case, the movement of the flash body in the forward and backward directions can be controlled by controlling the actuator, without using any lock and release mechanism such as a lock lever and a pop-up button.

Further, the camera body 10 may be provided at the opposite sides of the lens barrel with a pair of flash bodies so as to constitute the so-called multiple synchro flashes.

Accordingly, it is intended to include all such alternatives and modifications as fall within the spirit and scope of the appended claims.

What is claimed is:

1. A camera comprising:

a camera body which is integrally formed with a lens barrel containing a lens having an optical axis, and which defines a receiving chamber extending along a lateral side of the lens barrel in parallel to the optical axis of the lens, the receiving chamber having front and rear end portions and being open forward and upward at the front end portion thereof; and an elongated electronic flash body having top and bottom ends and provided at its one side with a light emitting window located near a top end thereof, the flash body being built into the camera body through a pop-up means so as to be moved between a first position at which substantially the overall length of the flash body is received into the receiving chamber in a state that the light emitting window is oriented downward and that the bottom end of the flash body is located in the rear end portion of the receiving chamber, and a second position at which the flash body is raised upward from the camera body in a state that the light emitting window is oriented forward and that the bottom end of the flash body is located in the front end portion of the receiving chamber.

2. A camera according to claim 1, wherein the pop-up means comprises:

a pushing means for moving the bottom end of the flash body from the rear end portion to the front end portion of the receiving chamber, the pushing means being adapted to apply a pushing force to the flash body near the bottom end thereof; and a guide means for raising upward the flash body from the camera body by utilizing the pushing force of the pushing means when the bottom end of the flash body approaches the front end portion of the receiving chamber.

3. A camera according to claim 2, wherein the guide means comprises:

a stopper member disposed in the front end portion of the receiving chamber and fixed to the camera body; and a stopper pin fixed to the flash body at a position near the bottom end of the flash body so as to be abutted on the stopper member at a position which is spaced forward and upward from a point of action of the pushing force of the pushing means in relation to the flash body when the bottom end of the flash body approaches the front end portion of the receiving chamber.

4. A camera according to claim 3, wherein the guide means further comprises:

a guide plate which defines therein an elongated guide slot extending between the front and rear end portions of the receiving chamber and which is integrally formed with the stopper member; and a guide pin fixed to the flash body at a position near the bottom end of to the flash body and slidably engaged with the guide slot of the guide plate, the pushing force of the pushing means being applied to the flash body through the guide pin.

5. A camera according to claim 2, further comprising:

a lock member, supported by the camera body, for locking the flash body in the first position against the pushing force of the pushing means, the lock member being forced by a bias spring so as to engage with the flash body when the flash body is located at the first position; and a releasing member supported by the camera body and adapted to push the locking member against the spring force of the bias spring so as to release the locking member from the flash body.

6. A camera according to claim 2, wherein the pushing means is a bias spring disposed between the camera body and the flash body.

* * * * *